(12) United States Patent
Yamasaki

(10) Patent No.: US 9,049,365 B2
(45) Date of Patent: Jun. 2, 2015

(54) IMAGE CAPTURING APPARATUS AND CONTROL METHOD THEREOF

(75) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/991,205

(22) PCT Filed: Nov. 29, 2011

(86) PCT No.: PCT/JP2011/006669
§ 371 (c)(1),
(2), (4) Date: Jun. 3, 2013

(87) PCT Pub. No.: WO2012/077301
PCT Pub. Date: Jun. 14, 2012

(65) Prior Publication Data
US 2013/0250149 A1 Sep. 26, 2013

(30) Foreign Application Priority Data

Dec. 10, 2010 (JP) ................. 2010-275958

(51) Int. Cl.
| | |
|---|---|
| *H04N 5/232* | (2006.01) |
| *H04N 5/225* | (2006.01) |
| *G02B 7/28* | (2006.01) |
| *G02B 7/34* | (2006.01) |
| *G03B 13/36* | (2006.01) |

(52) U.S. Cl.
CPC ............. *H04N 5/23212* (2013.01); *G02B 7/28* (2013.01); *G02B 7/34* (2013.01); *G03B 13/36* (2013.01)

(58) Field of Classification Search
CPC ............ H04N 5/3696; H04N 5/23212; H04N 5/2254; H04N 5/23293
USPC ............... 348/345–356; 396/63–70, 213–262
See application file for complete search history.

(56) References Cited

U.S. PATENT DOCUMENTS

| | | | |
|---|---|---|---|
| 2006/0018650 A1* | 1/2006 | Ichimiya | 396/104 |
| 2006/0228098 A1* | 10/2006 | Yoshida | 396/128 |
| 2008/0118238 A1* | 5/2008 | Sogawa et al. | 396/128 |

(Continued)

FOREIGN PATENT DOCUMENTS

| | | |
|---|---|---|
| JP | 05-127073 A | 5/1993 |
| JP | 2008-015157 A | 1/2008 |
| JP | 2009-003122 A | 1/2009 |

(Continued)

*Primary Examiner* — Sinh Tran
*Assistant Examiner* — Xi Wang
(74) *Attorney, Agent, or Firm* — Fitzpatrick, Cella, Harper & Scinto

(57) ABSTRACT

The image capturing apparatus (10) includes an image sensor 16 photoelectrically converting an object image formed by an image taking optical system (62), first and second photoelectric conversion elements provided in the image sensor or a focus detection element and photoelectrically converting paired focus detecting images formed by light fluxes passing through pupil areas of the image taking optical system, a filter processor (20) performing an image signal restoration process using a filter on first and second image signals obtained from the first and second photoelectric conversion elements, and a focus detector (20, 40) detecting a focus state based on a phase difference between the first and second image signals after the image signal restoration process. The filter processor calculates a contrast direction in which the object image has contrast, by using an output from the image sensor, and changes the filter depending on the contrast direction.

3 Claims, 4 Drawing Sheets

(56) References Cited

U.S. PATENT DOCUMENTS

| | | |
|---|---|---|
| 2008/0158417 A1* | 7/2008 | Living .......................... 348/452 |
| 2008/0317454 A1 | 12/2008 | Onuki |
| 2010/0177205 A1* | 7/2010 | Shimoda et al. ........... 348/222.1 |
| 2011/0135292 A1 | 6/2011 | Iwane |
| 2011/0164165 A1 | 7/2011 | Hashimoto et al. |
| 2012/0189226 A1* | 7/2012 | Okada .......................... 382/260 |

FOREIGN PATENT DOCUMENTS

| | | | | |
|---|---|---|---|---|
| JP | 2009111587 | * | 5/2009 | ............. H04N 5/232 |
| JP | 2010-048933 A | | 3/2010 | |
| JP | 2010-117679 A | | 5/2010 | |

* cited by examiner

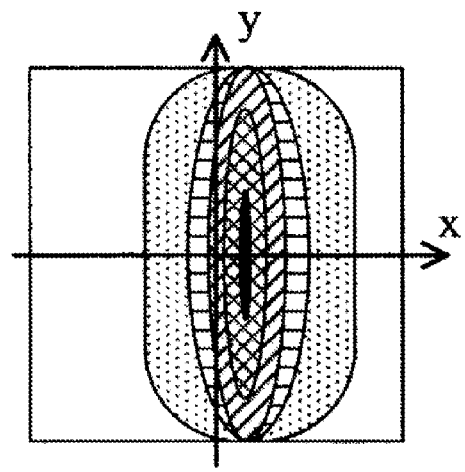
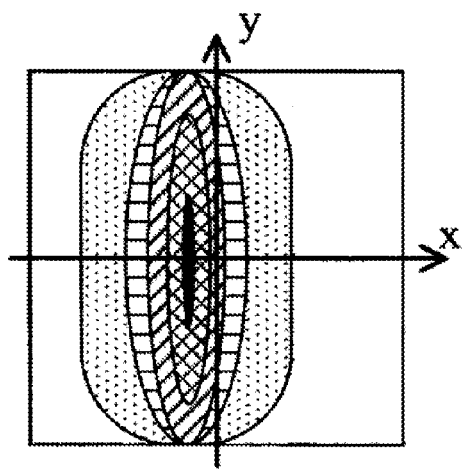
FIG. 2A　　　　　　　FIG. 2B
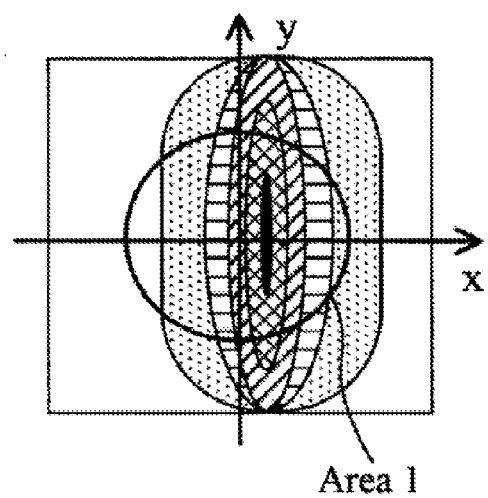
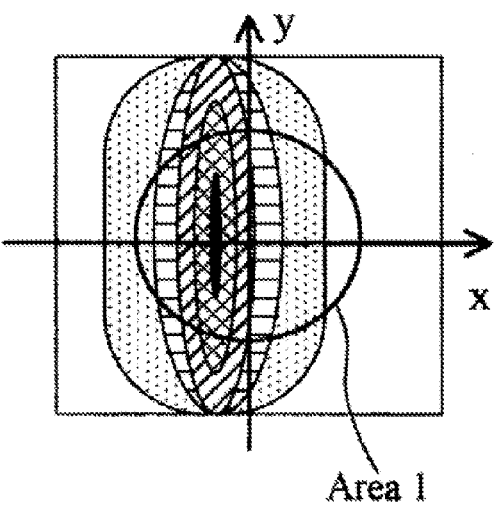
FIG. 3A　　　　　　　FIG. 3B
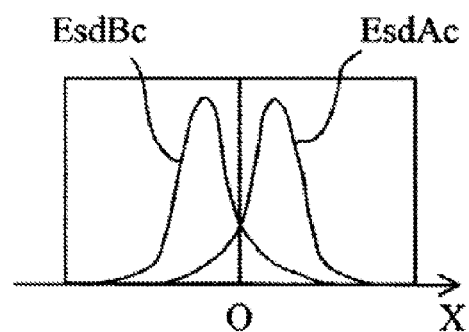
FIG. 3C

IMAGE CAPTURING APPARATUS AND CONTROL METHOD THEREOF

TECHNICAL FIELD

The present invention relates to an image capturing apparatuses such as a digital still camera and a video camera, and particularly to an image capturing apparatus capable of performing focus detection by a phase difference detection method.

BACKGROUND ART

A focus detection process by using the phase difference detection method causes light fluxes passing through mutually different pupil areas of an image taking optical system (that is, pupil-divided light fluxes) to form paired object images, photoelectrically converts the paired object images to produce paired image signals, and then calculates a phase difference between the paired image signals. The focus detection process further calculates a focus state (defocus amount) of the image taking optical system based on the phase difference.

Such phase difference detection method focus detection uses a photoelectric conversion element in a focus detection unit separate from an image sensor that photoelectrically converts an object image formed by a light flux from the image taking optical system or partial pixels of the image sensor.

Japanese Patent Laid-Open No. 2009-003122 discloses an image capturing apparatus that provides two focus detection pixel groups in an image sensor, that performs pupil-division of a light flux from an image taking optical system into two light fluxes by off-centering aperture portions of one and the other of the two focus detection pixel groups to mutually opposite sides, and that photoelectrically converts paired object images formed by the two light fluxes by the two focus detection pixel groups.

There is a problem in the phase difference detection method focus detection that vignetting of the light flux traveling toward the focus detection unit or the image sensor provided with the focus detection pixel groups decreases a degree of coincidence of the paired object image signals, which results in deterioration of focus detection accuracy. A state of the vignetting is changed with states of the image taking optical system such as a zoom state, a focus state or an aperture stop state and with an image height.

Japanese Patent Laid-Open No. 2010-117679 discloses an image capturing apparatus that restores paired image signals according to a light flux vignetting state by a filter process to increase a degree of coincidence of the paired image signals, and thereby improves focus detection accuracy.

SUMMARY OF INVENTION

Technical Problem

However, although the image capturing apparatus disclosed in Japanese Patent Laid-Open No. 2010-117679 calculates a filter to be used in the filter process according to the vignetting state of the light flux to be used for the focus detection, the apparatus does not take into consideration a type of an object, particularly a direction in which the object has contrast. Therefore, the apparatus may perform restoration of the image signals inappropriate for the contrast direction of the object. In this case, the degree of coincidence of the paired image signals is not sufficiently increased, which makes it impossible to improve the focus detection accuracy.

The present invention provides an image capturing apparatus capable of providing high focus detection accuracy, regardless of the contrast direction of the object and a control method thereof.

Solution to Problem

The present invention provides as an aspect thereof an image capturing apparatus including an image sensor configured to photoelectrically convert an object image formed by an image taking optical system, first photoelectric conversion elements and second photoelectric conversion elements provided in one of the image sensor and a focus detection element separate from the image sensor, and configured to respectively photoelectrically convert paired focus detecting images formed by light fluxes passing through mutually different pupil areas of the image taking optical system, and a filter processor configured to perform an image signal restoration process using a filter on a first image signal obtained from the first photoelectric conversion elements and on a second image signal obtained from the second photoelectric conversion elements, and a focus detector configured to detect a focus state of the image taking optical system based on a phase difference between the first and second image signals after the image signal restoration process. The filter processor is configured to calculate a contrast direction in which the object image has contrast, by using an output from the image sensor, and configured to change the filter depending on the contrast direction.

The present invention provides as an aspect thereof a method of controlling an image capturing apparatus including an image sensor configured to photoelectrically convert an object image formed by an image taking optical system, and first photoelectric conversion elements and second photoelectric conversion elements provided in one of the image sensor and a focus detection element separate from the image sensor and configured to respectively photoelectrically convert paired focus detecting images formed by light fluxes passing through mutually different pupil areas of the image taking optical system. The method includes a filter processing step of performing an image signal restoration process using a filter on a first image signal obtained from the first photoelectric conversion elements and on a second image signal obtained from the second photoelectric conversion elements, and a focus detecting step of detecting a focus state of the image taking optical system based on a phase difference between the first and second image signals after the image signal restoration process. In the filter processing step, the method calculates a contrast direction in which the object image has contrast, by using an output from the image sensor, and changes the filter depending on the contrast direction.

Other aspects of the present invention will be apparent from the embodiments described below with reference to the drawings.

BRIEF DESCRIPTION OF DRAWINGS

FIGS. 2A and 2B show light reception intensity distributions of focus detection light fluxes on a pupil surface of an image taking lens.

FIGS. 3A and 3B show vignetting of the focus detection light fluxes, and FIG. 3C shows projections of the light reception intensity distributions of the focus detection light fluxes in a y-axis direction.

DESCRIPTION OF EMBODIMENTS

Examples of the present invention will hereinafter be described with reference to the accompanying drawings.

Figure 1:
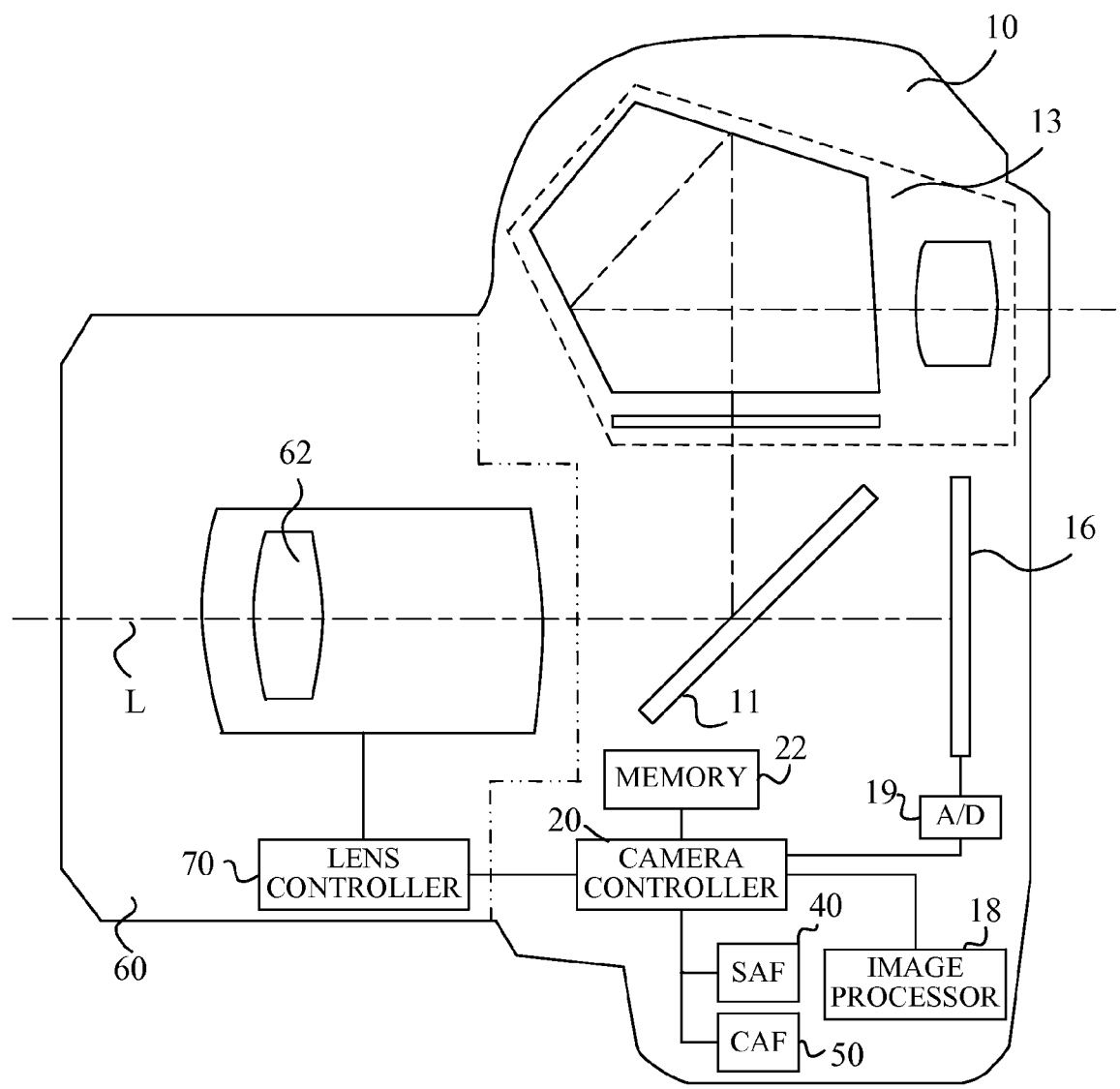
FIG. 1 is a block diagram showing the configuration of a digital camera that is an example of the present invention.

FIG. 1 shows the configuration of a camera system constituted by a digital single-lens reflex camera (hereinafter also simply referred to as "a camera") 10 as an image capturing apparatus that is an example of the present invention and an interchangeable lens 60. Although this embodiment describes the digital single-lens reflex camera, other image capturing apparatuses such as a video camera and a lens-integrated camera are alternative embodiments of the present invention.

The interchangeable lens 60 is detachably attachable to the camera 10, and includes an image taking optical system (hereinafter referred to as "an image taking lens") 62 and a lens controller 70 constituted by an MPU, a CPU or the like. The lens controller 70 is connected with a camera controller 20 constituted by an MPU, a CPU or the like through communication contacts provided in a mount portion, which is shown by a chain double-dashed line, and thereby can communicate with the camera controller 20.

The image taking lens 62 causes a light flux from an object (not shown) to form an object image that is an optical image of the object. The image taking lens 62 includes lenses such as a focus lens (not shown) that is moved in a direction in which an optical axis L extends to perform focusing, and an aperture stop (not shown) that changes its aperture diameter to adjust an amount of light passing through the image taking lens 62. The direction in which the optical axis L extends is shown by a dashed line, and hereinafter referred to as "an optical axis direction".

The lens controller 70 performs various calculation and control (including control of the movement of the focus lens) relating to the image taking lens 62. Moreover, the lens controller 70 detects a current position of the focus lens and a current position (aperture diameter) of the aperture stop, and sends lens information including the focus lens position and the aperture stop position to the camera controller 20 in response to demands from the camera controller 20. In addition, the lens controller 70 sends optical information unique to the interchangeable lens 60 such as focal length information (zoom lens position), aberration information and vignetting information to the camera controller 20.

The camera 10 includes a main mirror 11, a viewfinder optical system 13, an image sensor (image pickup element) 16, an image processor 18, the camera controller 20, a memory 22, an image sensor phase difference AF (SAF) part 40 and a contrast AF (CAF) part 50.

The main mirror 11 is disposed between the image taking lens 62 and the image sensor 16. When a user observes the object through the viewfinder optical system 13 or an electronic viewfinder described later (that is, at a time of viewfinder observation), the main mirror 11 is disposed in an optical path from the image taking lens to the image sensor 16. On the other hand, at a time of image capturing, the main mirror 11 is retracted outside the optical path. The main mirror 11 is constituted by a half mirror. At the time of the viewfinder observation, the light flux from the image taking lens 62 is divided into a reflected light flux that is reflected by the main mirror 11 to be introduced to the viewfinder optical system 13 and a transmitted light flux that is transmitted through the main mirror 11 to travel toward the image sensor 16. The viewfinder optical system 13 includes a focusing screen, a pentaprism and an ocular lens.

The reflected light flux from the main mirror 11 forms an object image on a matte surface of the focusing screen. The object image on the matte surface is observed by the user through the pentaprism and the ocular lens. On the other hand, the transmitted light flux from the main mirror 11 forms another object image on the image sensor 16. The image sensor 16 photoelectrically converts the object image to output an analogue image capturing signal. The analog image capturing signal is converted into a digital image capturing signal by an A/D converter 19, and the digital image capturing signal is input to the image processor 18 through the camera controller 20.

The image processor 18 performs various image processing on the digital image capturing signal to produce a captured image (image data). The image data produced by the image processor 18 at the time of viewfinder observation is displayed on a monitor (not shown) provided on a back face of the camera 10 as an electronic viewfinder image. Moreover, the image processor 18 sends contrast data (luminance data) of the produced image data, which is used for contrast AF, to the CAF part 50 through the camera controller 20. In addition, the image data produced by the image processor 18 at the time of image capturing is recorded in a recording medium (not shown) such as a semiconductor memory.

The image sensor 16 is constituted by a CCD sensor or a CMOS sensor and a peripheral circuit thereof. The image sensor 16 includes horizontal m pixels and vertical n pixels. Each pixel includes a photoelectric conversion part that photoelectrically converts part of the object image. The image sensor 16 is configured such that each of all the pixels is capable of individually outputting a pixel signal. Moreover, the image sensor 16 includes, as the above-described pixels, plural RGB image capturing pixels (hereinafter collectively referred to as "an image capturing pixel group") and plural focus detection pixels (hereinafter collectively referred to as "a focus detection pixel group") discretely arranged among the RGB image capturing pixels.

Detailed description of the RGB image capturing pixels (image capturing pixel group) and the focus detection pixels (focus detection pixel group) in the image sensor 16 will hereinafter be made. The image capturing pixel group is arranged over the entire image sensor 16 in order to photoelectrically convert the object image (hereinafter referred to as "a capturing object image") formed by the light flux passing through the whole area of an exit pupil of the image taking lens 62. The image sensor 16 outputs the analog image capturing signal corresponding to the capturing object image from the image capturing pixel group.

The focus detection pixel group includes a first focus detection pixel group (first photoelectric conversion elements) and a second focus detection pixel group (second photoelectric conversion elements) that respectively photoelectrically convert paired images (paired focus detecting images, and hereinafter referred to as "focus detecting object images") formed by light fluxes passing through mutually different areas of the exit pupil (hereinafter referred to as "pupil areas").

Each focus detection pixel includes a microlens that causes as much as possible of the light flux from the pupil area to enter that pixel. Moreover, the first and second focus detection pixels include aperture portions (pixel apertures) that are off-centered to mutually opposite sides with respect to a center of the pixel (that is, a center of the microlens). Such configurations of the first and second focus detection pixels (groups) realizes a pupil dividing optical system or a pupil dividing function that performs pupil-division of the light flux from the image taking lens 62. The first and second focus detection pixel groups photoelectrically convert the paired focus detecting object images formed by the paired pupil-divided light fluxes to output paired image signals (first and second image signals) to the SAF part 40 through the A/D converter 19 and the camera controller 20.

For example, in the image sensor 16, among four (2 columns×2 rows) pixels arranged in a Bayer arrangement where two G pixels are arranged at two diagonal places and an R and B pixels are arranged at other two diagonal places, the two G pixels are used as the image capturing pixels and the R and B pixels are replaced by the first and the second focus detection pixels.

The SAF part 40 performs correlation calculation on the paired image signals from the first and second focus detection pixel groups to calculate a phase difference between the paired image signals. The camera controller 20 calculates a defocus amount that shows a focus state of the image taking lens 62 on the basis of the phase difference, and sends a focus lens driving instruction corresponding to the defocus amount to the lens controller 70. The lens controller 70 moves the focus lens in the optical axis direction through an actuator (not shown) in response to the focus lens driving instruction to obtain an in-focus state. Thus, the SAF part 40 and the camera controller 20 perform phase difference AF using the image sensor 16 as a focus detection element. The phase difference AF includes focus detection by the above-described phase difference detection method and drive of the focus lens.

At the time of image capturing, the output (pixel signal) from the focus detection pixel that cannot provide R, G and B image capturing signals is not used to produce the captured image. However, the camera controller 20 and the image processor 18 perform interpolation calculation using the outputs from the image capturing pixels arranged around the focus detection pixel to produce an image capturing signal for a position of the focus detection pixel, and thereby produce a captured image including no lack of pixels.

The camera controller 20 controls the respective parts in the camera 10, and controls the respective parts in the interchangeable lens 60 through the lens controller 70. The camera controller 20 further performs AF control to move the focus lens through the lens controller 70, on the basis of the focus state detected by the SAF part 40 and the CAF part 50.

A memory 22 stores a computer program necessary for operations of the camera controller 20 and the image processor 18, various information, various setting values and the like.

The CAF part 50 performs AF by a contrast detection method (contrast AF) by using contrast data of the image data sent from the image processor 18. The CAF part 50 produces an AF evaluation value (contrast evaluation value) from the contrast data, and moves the focus lens to a position (that is, an in-focus position) at which the AF evaluation value becomes maximum.

Next, description of processes performed by the camera 10 of this embodiment will be made. FIGS. 2A and 2B respectively show intensity distributions of the light fluxes passing through the mutually different pupil areas in the exit pupil of the image taking lens 62 and entering the first and second focus detection pixels. The intensity of the light flux entering the focus detection pixel is hereinafter referred to as "a light reception intensity", and the intensity distribution of the light flux entering the focus detection pixel is hereinafter referred to as "a light reception intensity distribution". In FIGS. 2A and 2B, an x-axis corresponds to a direction (left and right direction) perpendicular to a paper surface of FIG. 1, and a y-axis corresponds to an up and down direction in FIG. 1. Moreover, in these figures, in an oval light reception area, the light reception intensity increases inward.

The light flux entering the focus detection pixel receives influences of diffraction by the microlens or the pixel aperture which is provided in the focus detection pixel, so that the light reception intensity distributions shown in FIGS. 2A and 2B are widely spread.

In this embodiment, the first and second focus detection pixels have a structure to divide the exit pupil of the image taking lens 62 in the left and right direction. Combining the pixel signals from the first focus detection pixels discretely arranged in the left and right direction produces the first image signal, and combining the pixel signals from the second focus detection pixels discretely arranged in the same direction produces the second image signal.

FIGS. 3A and 3B respectively show that the light fluxes having the light reception intensity distributions shown in FIGS. 2A and 2B are vignetted by a constituent element of the interchangeable lens 60, or the lens or the aperture stop of the image taking lens 62. Only a light flux passing through the inside of an area Area 1 enters each of the first and second focus detection pixels with a light reception intensity distribution shown in FIG. 3C.

However, the vignetting in an actual image taking lens is more complex than that shown in FIGS. 3A and 3B, and the size and shape of the area Area 1 are changed depending on image heights or states of the image taking lens such as lens positions or aperture diameters.

The light reception intensity distributions shown in FIG. 3C are projections obtained by projecting the light reception intensity distributions shown in FIGS. 3A and 3B in the y-axis direction. In FIG. 3C, a horizontal axis shows coordinates in the x-axis direction (x coordinates) on an exit pupil plane, and a vertical axis shows intensity integrated values obtained by integrating (adding) the light reception intensities at respective y coordinates included in the area Area 1 at the respective x coordinates. The projection EsdAh corresponds to the light reception intensity distribution shown in FIG. 3A, and the projection EsdBh corresponds to the light reception intensity distribution shown in FIG. 3B.

In each of the left and right pupil areas, though the light reception intensity distribution is symmetric in the left and right direction, the area Area 1 has a shape asymmetric with respect to the light reception intensity distribution in the left and right direction, so that each of the projections EsdAh and EsdBh has a shape asymmetric in the left and right direction.

When f(x, y) represents a light intensity distribution of an object, and g(x, y) represents a light intensity distribution of an object image, g(x, y) can be expressed by the following expressions (1):

$$g(x, y) = \int_{-\infty}^{\infty}\int_{-\infty}^{\infty} f(x-a, y-b)P(a, b)\,da\,db \quad (1)$$

where P(x, y) represents a transfer function showing a state of the object image degraded by the image taking lens 62 (or by the entire image capturing system including the image taking lens 62, the image sensor 16 and the image processor 18), and it is called a point spread function (PSF). Normally, a two-dimensional object image is shown by using the point spread function.

However, the phase difference detection method treats the focus detecting object image as a one-dimensional image, so that this embodiment uses a line spread function (LSF), instead of the point spread function. When, in the above expression (1), the light intensity distribution of the object is represented by f(x), the light intensity distribution of the focus detecting object image is represented by g(x), and the line spread function is represented by L(a), the expression (1) is rewritten as the following expression (2):

$$g(x) = \int_{-\infty}^{\infty} f(x-a)L(a)da \qquad (2)$$

Moreover, the line spread function can be calculated by projecting the point spread function as shown by the following expression (3). In other words, the line spread function can be calculated by integrating the point spread function in one direction.

$$L(a) = \int_{-\infty}^{\infty} P(a,b)db \qquad (3)$$

According to the expressions (2) and (3), knowing the line spread function makes it possible to calculate the focus detecting object image (that is, the image signal) in this embodiment performing the phase difference detection method focus detection.

The point spread function of an optical system can be derived by considering that a shape of an exit pupil of the optical system is projected to be reduced on an image-forming plane if ignoring aberration. The point spread function for the focus detection in this embodiment corresponds to the light reception intensity distribution in the area Area 1 shown in FIGS. 3A and 3B, and the line spread function corresponds the projections EsdAc and EsdBc shown in FIG. 3C. Moreover, the line spread function when the image taking lens 62 is in a defocused state can be produced by extending or shortening the projections EsdAc and EsdBc shown in FIG. 3C in the left and right direction.

The phase difference detection method focus detection generally calculates, on an assumption that a degree of coincidence of paired image signals is high, a phase difference that is a shift amount between the paired image signals. Therefore, it is necessary that the line spread function corresponding to each of the paired image signals be symmetric in a direction in which the phase difference is calculated.

However, since each of the light reception intensity distributions in the area Area 1 shown in FIGS. 3A and 3B is not symmetric with respect to a center (optical axis position) of the area Area 1, each of the projections EsdAc and EsdBc has an asymmetric shape in the left and right direction. Calculating the phase difference directly from the image signals corresponding to the projections having such an asymmetric shape increases a calculation error, which results in deterioration of focus detection accuracy (that is, of AF accuracy). Thus, restoring the asymmetry of each image signal to increase the degree of coincidence of the image signals is effective in improving the focus detection accuracy.

Next, description will be made of an image signal restoration process to correct the asymmetry of the image signal.

Figure 4A:
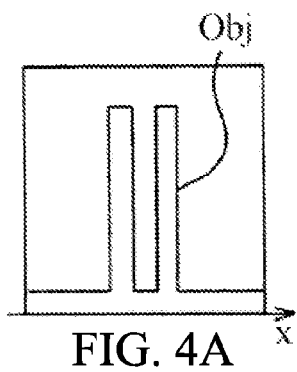
FIG. 4A shows a light intensity distribution of an object image.

The asymmetry of the image signal is caused by convolution of an asymmetric line spread function. FIGS. 4A to 4G show a concept of the image signal restoration process. In these figures, a horizontal axis x shows a direction in which the focus detection pixels are lined, and a vertical axis shows intensity of the image signal. FIG. 4A shows a light intensity distribution Obj of an object (hereinafter referred to as "an object light intensity distribution Obj"), and FIGS. 4B and 4C show line spread functions EsdAx and EsdBx at an off-axis image height in the image sensor 16.

The line spread functions EsdAc and EsdBc shown in FIG. 3C correspond to on-axis (or near axis) focus detection pixels in the image sensor 16, so that each of the line spread functions EsdAc and EsdBc has an asymmetric shape in the left and right direction, and the line spread functions EsdAc and EsdBc approximately have mirror-inverted shapes. However, the line spread functions EsdAx and EsdBx shown in FIGS. 4B and 4C correspond to off-axis focus detection pixels in the image sensor 16, so that the line spread functions EsdAx and EsdBx have shapes unrelated to each other.

Figure 4D:
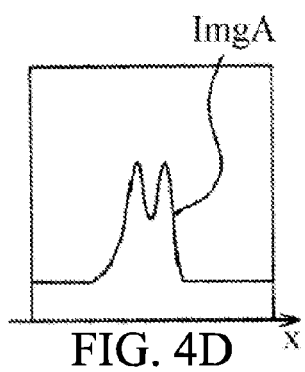
FIGS. 4D and 4E show non-restored image signals.
Figure 4B:
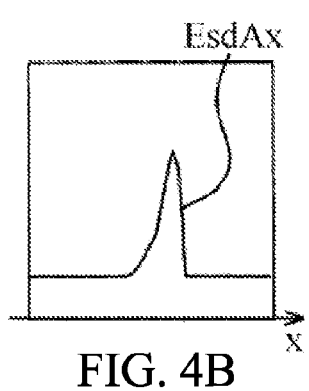
FIGS. 4B and 4C show line spread functions at an off-axis image height.
Figure 4E:
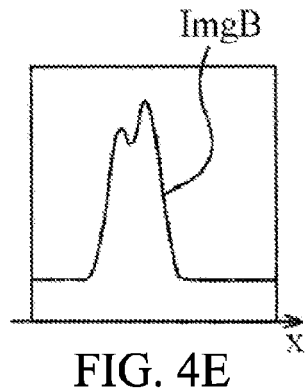
Figure 4C:
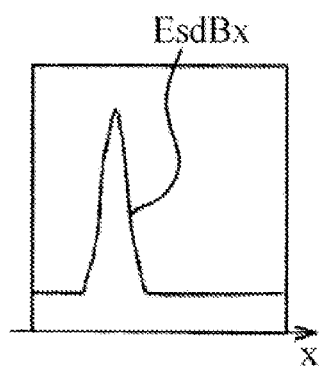

FIGS. 4D and 4E respectively show an image signal A (ImgA) and another image signal B (ImgB) in a certain defocused state. These image signals A (ImgA) and B (ImgB) are respectively obtained by performing convolution on the object light intensity distribution Obj with the line spread functions EsdAx and EsdBx according to the expression (2).

Figure 4F:
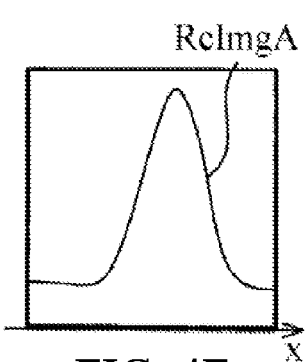
FIGS. 4F and 4G show restored image signals.
Figure 4G:
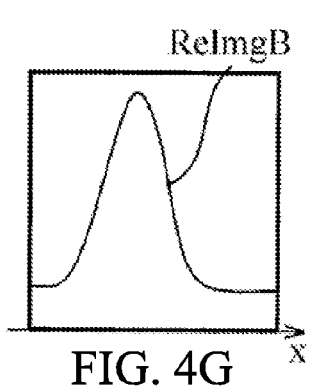

FIG. 4F shows a restored image signal A (ReImgA) that is an image signal after the image signal restoration process that performs convolution on the image signal A (ImgA) with the line spread function EsdBx. FIG. 4G shows a restored image signal B (ReImgB) that is an image signal after the image signal restoration process that performs convolution on the image signal B (ImgB) with the line spread function EsdAx. Although these restored images ReImgA and ReImgB are shifted with respect to each other in the left and right direction, they has been restored such that they have mutually identical shapes, that is, such that the degree of coincidence of these restored images ReImgA and ReImgB becomes high. Description will hereinafter be made of a principle of the restoration of the image signals to give them mutually identical shapes.

In this embodiment, the "identical shapes" is not limited to perfectly identical shapes, and may be shapes that can be regarded as identical shapes for the correlation calculation.

The image signal A (ImgA) before the image signal restoration process (hereinafter referred to as "a non-restored image signal A (ImgA)") is obtained by the above-mentioned expression (2). When KA(x) represents the restored image signal A (ReImagA) being obtained by performing the convolution on this non-restored image signal A (ImgA) with the line spread function EsdBx, KA(x) is expressed by the following expression (4):

$$k_A(x) = \int_{-\infty}^{\infty} g_A(x-b)L_B(b)db \qquad (4)$$
$$= \int_{-\infty}^{\infty}\int_{-\infty}^{\infty} f(x-a-b)L_A(a)da\,L_B(b)db$$
$$= \int_{-\infty}^{\infty}\int_{-\infty}^{\infty} f(x-a-b)L_A(a)L_B(b)da\,db$$

Similarly, when KB(x) represents the restored image signal B (ReImagB) being obtained by performing the convolution on this non-restored image signal B (ImgB) with the line spread function EsdAx, KB(x) is expressed by the following expression (5):

$$k_B(x) = \int_{-\infty}^{\infty} g_B(x-b) L_A(b) db \qquad (5)$$

$$= \int_{-\infty}^{\infty} \int_{-\infty}^{\infty} f(x-a-b) L_B(a) da L_A(b) db$$

$$= \int_{-\infty}^{\infty} \int_{-\infty}^{\infty} f(x-a-b) L_A(a) L_B(b) da db$$

As understood from the expressions (4) and (5), the restored image signal A (ReImagA) and the restored image signal B (ReImagB) have the mutually identical shapes.

Thus, this embodiment enables acquisition of such restored image signals A (ReImagA) and B (ReImagB) having a high degree of coincidence appropriate for the correlation calculation in the phase difference detection method focus detection.

The expressions (4) and (5) provide restored image signals A (ReImagA) and B (ReImagB) that are perfectly identical to each other, which generates no phase difference therebetween with defocusing. Thus, an actual image signal restoration process performs the convolution according to the expressions (4) and (5) such that a relative interval between centroids of the non-restored image signals A (ImgA) and B (ImgB) is not changed. For example, the actual image signal restoration process parallel shifts the line spread functions LA(b) and LB(b) used for the convolution according to the expressions (4) and (5) in the left and right direction to cause their centroid positions to match each other, and then performs the convolution in such a state where the centroid positions are matched each other. This process enables the restoration of only distortion of each image signal without changing a relative interval between centroids of the restored image signals A (ReImagA) and B (ReImagB).

In order to acquire correct restored image signals A (ReImagA) and B (ReImagB), it is necessary to use line spread functions appropriate for a defocus state of the non-restored image signals A (ImgA) and B (ImgB). However, the defocus amount of the image taking lens 62 is calculated by using the restored image signals A (ReImagA) and B (ReImagB), so that it is impossible to calculate a correct defocus amount before the image signal restoration process. Thus, this embodiment performs a process to calculate the restored image signals (image signal restoration process) plural times to solve the problem. Detailed description the plural image signal restoration processes will be made later.

Next, description will be made of a relationship between the line spread function and a contrast direction of the object image. The contrast direction of the object image means a direction in which the object image (that is, the object) has contrast that is a bright and dark difference (luminance difference) or a direction in which the contrast is higher than those in other directions. It is desirable that the contrast direction be a direction in which the contrast is highest.

As described with reference to the expression (3), the line spread function can be calculated by integrating the point spread function in one direction. However, in order to express the image taking lens (or the image capturing system) by the line spread function, a relationship between a light intensity distribution of the object and a distribution direction of the line spread function, that is, the x-axis direction shown in FIG. 3C is limited.

For example, in a case where a line image of a line object that is one infinitely thin white line existing in a black background is orthogonal to the x-axis, the line spread function can be expressed by the expression (3). However, in a case where the line image is inclined with respect to the x-axis, it is impossible to use the expression (3) because there is a limitation that the line spread function is allowed to express only a direction orthogonal to the line image.

The line spread function in the case where the line image is inclined with respect to the x-axis can be considered as a result of cutting, along the x-axis, point spread functions arranged in the inclination direction. Thus, when

θ represents an angle of the line image formed with the x-axis, the line spread function in the case where the line image is inclined with respect to the x-axis can be expressed by the following expression (6):

$$L(a) = \int_{-\infty}^{\infty} P(a - b\tan\theta, b) db \qquad (6)$$

Since the object generally has various contrast directions, calculation of the restored image signals according to the expression (4) and (5) by using the line spread function expressed by the expression (3) makes it impossible to express the line spread function due to the contrast direction of the object for the above-described reason. This deteriorates the focus detection accuracy.

Thus, this embodiment uses the line spread function shown by the expression (6) to realize highly accurate focus detection, regardless of the contrast direction, that is, regardless of types of the object (object image).

This embodiment has described that the restored images are acquired by the convolution according to the expressions (4) and (5). However, actual image signals A and B are discrete signals formed by the pixel signals from the focus detection pixels arranged so as to be dispersed at a predetermined interval, so that data of the line spread function expressed by the expressions (3) and (6) are also discrete data. Therefore, the convolution according to the expressions (4) and (5) in the image signal restoration process is actually performed as a filter process.

Thus, this embodiment changes a filter to be used in the image signal restoration process performed on the paired image signals, depending on the contrast direction of the object image.

Next, description will be made of an SAF operation performed by the camera 10 with reference to a flowchart shown in FIG. 5. The SAF part 40 and the camera controller 20 execute the SAF operation, and the camera controller 20 controls the SAF operation according to a computer program stored in the memory 22. The camera controller 20 corresponds to a filter processor, and the SAF part 40 and the camera controller 20 correspond to a focus detector.

Figure 5:
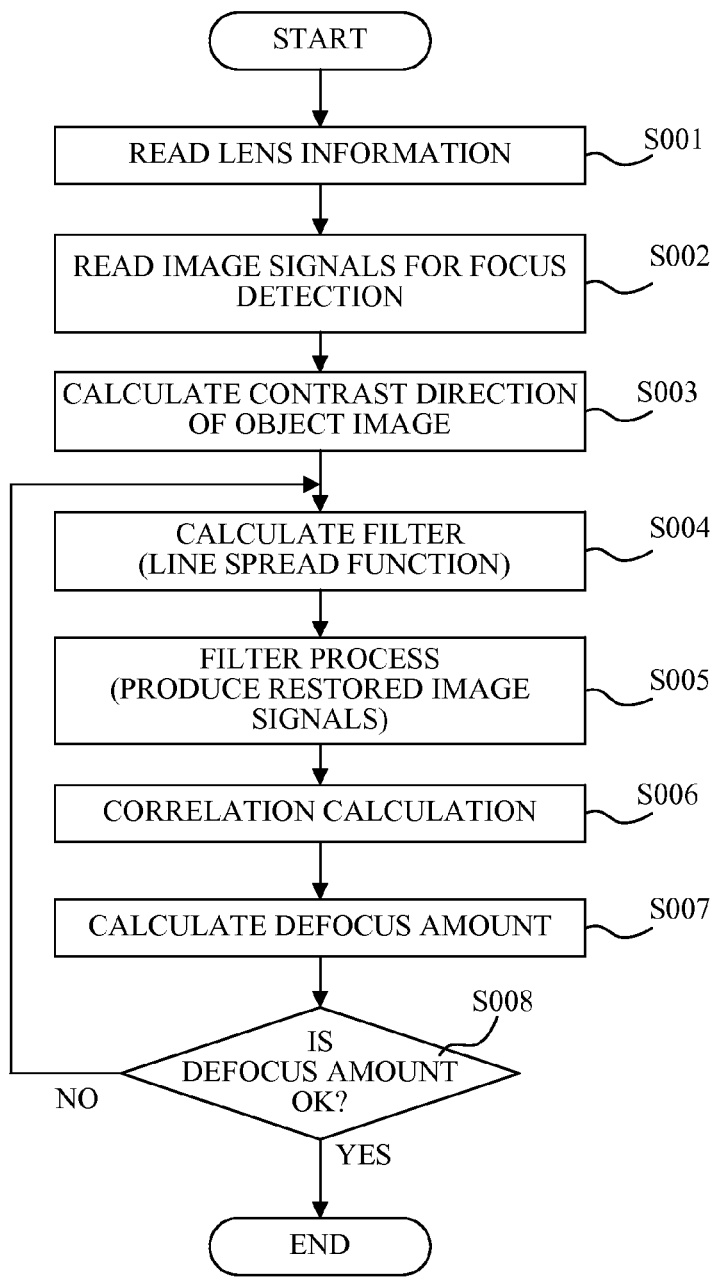
FIG. 5 is a flowchart of a focus detection process in the example.

The flowchart of FIG. 5 shows only a focus detection calculation process in the SAF operation, and omits processes performed thereafter such as drive of the focus lens. The focus detection calculation process is performed in response to an operation of an operating member (not shown) for outputting an AF start instruction.

At step S001, the camera controller 20 receives, from the lens controller 70, the lens information such as the focus lens position, the aperture value, the zoom lens position and the vignetting information. The vignetting information includes information on the size and the shape of the area Area 1 shown in FIGS. 3A and 3B.

Next, at step S002, the SAF part 40 produces the paired image signals A and B by using the pixel signals from the first and second focus detection pixel groups included in a focus detection area. The focus detection area is selected in an image capturing area of the camera 10 through an operation of an AF area selecting member (not shown).

Next, at step S003, the camera controller 20 calculates the contrast direction of the object image included in the focus detection area from which the SAF part 40 has read the image signals A and B at step S002. The contrast direction may be calculated from the read image signals, or may be calculated from the image data obtained on the basis of the output from the image capturing pixel group included in the focus detection area.

In this embodiment, the image capturing pixels are more densely arranged than the focus detection pixels discretely arranged. Therefore, it is possible to acquire the contrast direction more accurately by calculation from the image data obtained on the basis of the output from the image capturing pixels than by calculation from the output from the focus detection pixels. Although the contrast direction may be calculated in each of plural divided areas of the focus detection area, this embodiment calculates one representative contrast direction in the focus detection area to reduce calculation load in subsequent process.

Next, at step S004, the camera controller 20 reads the light reception intensity distribution of each focus detection pixel from the memory 22. Then, the camera controller 20 calculates the line spread function according to the expression (6) on the basis of the light reception intensity distribution, the vignetting information obtained at step S001 and the contrast direction calculated at step S003, to produce (calculate) the filter.

As described above, it is necessary to know the defocus amount in order to acquire the correct line spread function. However, the defocus amount has not been yet decided at this point. Then, the camera controller 20 calculates the line spread function by using a predetermined defocus amount as an initial value. When the process is returned from step S008 described later, the camera controller 20 uses the defocus amount previously calculated.

Next, at step S005, the camera controller 20 calculates the restored image signals A and B by using the filter produced at step S004 on the basis of the concept of the expressions (4) and (5). The above-mentioned initial value is not limited to a fixed value, and may be a variable value according to the lens information or optical information, or may be calculated by using a result of performing the correlation calculation on the non-restored image signals A and B.

Next, at step S006, the camera controller 20 performs processes such as a correction process for correcting unevenness of light intensity on the corrected image signals A and B. Then, the SAF part 40 performs the correlation calculation on the restored image signals A and B on which the correction process has been performed to calculate the phase difference between the restored image signal A and B.

Next, at step S007, the camera controller 20 converts the phase difference calculated at step S006 into the defocus amount of the image taking lens 62.

In addition, at step S008, the camera controller 20 determines whether or not the defocus amount calculated at step S007 satisfies a predetermined condition. If the defocus amount satisfies the predetermined condition, the camera controller 20 ends this SAF operation. If the defocus amount does not satisfy the predetermined condition, the camera controller 20 returns to step S004.

The "predetermined condition" is that a difference between the defocus amount previously calculated and the defocus amount currently calculated is equal to or smaller than a predetermined value. Therefore, in an initial flow, the process inevitably returns from step S008 to step S004. Such determination is made because, as described above, the line spread function on the basis of which the filter is produced is decided based on the defocus amount. Performing such determination causes convergence calculation of the restored image signals to be performed by plural calculations thereof, which makes it possible to calculate a more accurate defocus amount.

Although omitted in FIG. 5, an upper limit for the number of calculation times of the restored image signals may be decided. Then, if the restored image signals are not converged after the decided number of times of the calculations, determination that it is impossible to obtain an in-focus state may be made.

As described above, this embodiment performs the restoration of the image signals appropriate for the contrast direction of the object image, thereby enabling improvement of focus detection accuracy by the phase difference detection method, that is, focus control accuracy, regardless of the types of the object (the contrast direction of the object image).

Although this embodiment has described the case of performing the phase difference AF by using the output signals from the focus detection pixels provided in the image sensor (that is, by using the image sensor as the focus detection element), the phase difference AF may be performed by using a photoelectric conversion element separate from the image sensor as the focus detection element. For example, a configuration may be employed which causes a light flux transmitted through the main mirror 11 to be reflected by a sub mirror (not shown) placed behind the main mirror 11 to introduce the reflected light flux to the photoelectric conversion element while dividing it into two light fluxes. Then, the configuration causes the photoelectric conversion element to photoelectrically convert paired object images formed by the two light fluxes to acquire paired image signals.

Furthermore, the present invention is not limited to these embodiments and various variations and modifications may be made without departing from the scope of the present invention.

This application claims the benefit of Japanese Patent Application No. 2010-275958, filed on Dec. 10, 2010, which is hereby incorporated by reference herein in its entirety.

INDUSTRIAL APPLICABILITY

The present invention enables provision of image capturing apparatuses capable of performing good phase difference AF regardless of object's contrast direction.

The invention claimed is:

1. An image capturing apparatus comprising:
an image sensor configured to photoelectrically convert an object image formed by an image taking optical system;
photoelectric conversion elements provided in one of the image sensor and a focus detection element separate from the image sensor, and configured to respectively photoelectrically convert paired focus detecting images formed by light fluxes passing through the image taking optical system to produce a first image signal corresponding to one of the paired focus detecting images and a second image signal corresponding to the other one of the paired focus detecting images, the first and second image signals having a phase difference therebetween corresponding to a defocus amount of the image taking optical system;
a filter processor configured to perform an image signal restoration process using a filter on the first image signal and on the second image signal to provide restored first and second image signals; and a focus detector configured to detect a focus state of the image taking optical system based on the phase difference between the restored first and second image signals, wherein the filter processor is configured to calculate a contrast direction in which the object image has contrast, by using an output from the image sensor, and configured to change the filter depending on the contrast direction.

2. An image capturing apparatus according to claim 1, wherein the filter processor is configured to calculate projections of the paired focus detecting images corresponding to the contrast direction, and configured to produce the filter based on the projections.

3. A method of controlling an image capturing apparatus including an image sensor configured to photoelectrically convert an object image formed by an image taking optical system, and photoelectric conversion elements provided in one of the image sensor and a focus detection element separate from the image sensor and configured to respectively photoelectrically convert paired focus detecting images formed by light fluxes passing through the image taking optical system to produce a first image signal corresponding to one of the paired focus detecting images and a second image signal corresponding to the other one of the paired focus detecting images, the first and second image signals having a phase difference therebetween corresponding to a defocus amount of the image taking optical system, the method comprising:

a filter processing step of performing an image signal restoration process using a filter on the first image signal and on the second image signal to provide restored first and second image signals; and a focus detecting step of detecting a focus state of the image taking optical system based on the phase difference between the restored first and second image signals, wherein, in the filter processing step, the method calculates a contrast direction in which the object image has contrast, by using an output from the image sensor, and changes the filter depending on the contrast direction.

* * * * *